(12) United States Patent
Kase (10) Patent No.: US 9,341,928 B2
(45) Date of Patent: May 17, 2016

(54) LIGHT SOURCE DEVICE AND PROJECTOR

(71) Applicant: CASIO COMPUTER CO., LTD., Tokyo (JP)

(72) Inventor: Toshifumi Kase, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 406 days.

(21) Appl. No.: 13/847,730

(22) Filed: Mar. 20, 2013

(65) Prior Publication Data

US 2013/0250247 A1   Sep. 26, 2013

(30) Foreign Application Priority Data

Mar. 21, 2012   (JP) ................................. 2012-063438

(51) Int. Cl.
| | |
|---|---|
| *G03B 21/14* | (2006.01) |
| *F21V 14/00* | (2006.01) |
| *F21V 14/02* | (2006.01) |
| *F21V 14/04* | (2006.01) |
| *G03B 21/20* | (2006.01) |

(52) U.S. Cl.
CPC .............. *G03B 21/142* (2013.01); *F21V 14/00* (2013.01); *F21V 14/02* (2013.01); *F21V 14/04* (2013.01); *G03B 21/2013* (2013.01); *G03B 21/2066* (2013.01); *G03B 21/2033* (2013.01)

(58) Field of Classification Search
CPC ....................................................... G03B 21/00
USPC ............................................ 353/84; 359/443
See application file for complete search history.

(56) References Cited

U.S. PATENT DOCUMENTS

| | | | | |
|---|---|---|---|---|
| 7,677,735 | B2 * | 3/2010 | Kuo ................................. | 353/51 |
| 7,758,194 | B2 * | 7/2010 | Lin et al. ......................... | 353/87 |
| 8,167,440 | B2 | 5/2012 | Sato et al. | |
| 2005/0122481 | A1 * | 6/2005 | Yamasaki et al. ............... | 353/31 |
| 2012/0008108 | A1 | 1/2012 | Yoshimura et al. | |

FOREIGN PATENT DOCUMENTS

| | | |
|---|---|---|
| CN | 101937163 A | 1/2011 |
| CN | 102331653 A | 1/2012 |

(Continued)

OTHER PUBLICATIONS

Chinese Office Action dated Oct. 31, 2014, issued in counterpart Chinese Application No. 201310165393.7.

(Continued)

*Primary Examiner* — William C Dowling
*Assistant Examiner* — Jerry Brooks
(74) *Attorney, Agent, or Firm* — Holtz, Holtz & Volek PC (57) ABSTRACT

With a view to providing a light source device and a projector which can rearrange the light collection balance even in the event that the number of illuminated light emitting elements changes as a result of a change in the environment where they are used or in the specifications thereof, a light source device includes a holder 79 having element accommodating portions 79a which each accommodate one of a plurality of light emitting elements and an adjusting portion for moving mechanisms including an optical system such as reflection mirrors and the holder 79 which translate in parallel a center of a whole of optical axes of pencils of light emitted from the plurality of light emitting elements when light is not emitted from part of the plurality of light emitting elements.

8 Claims, 8 Drawing Sheets

(56) References Cited

FOREIGN PATENT DOCUMENTS

| | | | |
|---|---|---|---|
| JP | 2008256824 A | 10/2008 | |
| JP | 2010066368 A | 3/2010 | |
| JP | 2010181591 A | 8/2010 | |
| JP | 2011-013317 A | 1/2011 | |

OTHER PUBLICATIONS

Japanese Office Action (and English translation thereof) dated Jul. 30, 2015, issued in counterpart Japanese Application No. 2012-063438.

* cited by examiner

LIGHT SOURCE DEVICE AND PROJECTOR

CROSS-REFERENCE TO RELATED APPLICATION

This application is based upon and claims the benefit of priority under 35 USC 119 of Japanese Patent Application No. 2012-63438 filed on Mar. 21, 2012, the entire contents of which are incorporated herein by reference.

BACKGROUND OF THE INVENTION

1. Field of the Invention

The present invention relates to a light source device and a projector.

2. Description of the Related Art

Currently, data projectors are used on many occasions as image projection units which project the screen of a personal computer and video images, as well as images based on image data stored in a memory card onto a screen. In these data projectors, light emitted from a light source is collected to a micromirror display device called a DMD (Digital micromirror Device) or a liquid crystal panel for displaying of a color image on a screen.

Additionally, the projectors have been founding a wide variety of applications ranging from commercial presentations to domestic uses in association with the propagation of video equipment such as personal computers and DVD players.

Conventionally, the mainstream of these projectors has been those which use as a light source a high-intensity discharge lamp. In recent years, however, a plurality of semiconductor light emitting elements such as laser diodes have come to be used as a light source, and in association with the propagation of this tendency, there have been made many developments or proposals of light source units which include a plurality of optical parts such as lenses and mirrors.

Japanese Unexamined Patent Publication No. 2011-013317, which was early-published for the Japanese patent application previously filed by the applicant of this patent application, proposes a light source device in which a plurality of light sources are arranged into a matrix and spaces between light rays from the individual light sources are narrowed by mirrors which are arranged in a stairs-like fashion so as to reduce sectional areas of pencils of light which are emitted from the plurality of bright points, and a projector which includes this light source device.

In the projector, however, although the sectional areas of the pencils of light can be reduced by narrowing the spaces between the light rays emitted from the individual light sources by the plurality of mirrors, in the event that the number of light emitting elements changes in the same projector as a result of a change in the environment where the projector is used or in the specification thereof, there are caused fears that the light collection balance is collapsed, thereby producing luminance or color irregularities (unevenness) in projection light.

BRIEF SUMMARY OF THE INVENTION

The invention has been made in view of the problems inherent in the related art, and an object thereof is to provide a light source device which can rearrange the light collection balance and a projector including this light source device.

According to a first aspect of the invention, there is provided a light source device including a holder having element accommodating portions which each accommodate one of a plurality of light emitting elements, and an adjusting portion which translates in parallel a center of a whole of optical axes of pencils of light which are emitted from the plurality of light emitting elements when light is not emitted from part of the plurality of element accommodating portions.

According to a second aspect of the invention, there is provided a projector including the light source device according to the first aspect of the invention, a display element, a light source-side optical system for guiding light from the light source device, a projection-side optical system for projecting an image emitted from the display element on to a screen, and a projector control unit for controlling the light source device and the display element.

DETAILED DESCRIPTION OF THE INVENTION

Figure 1:
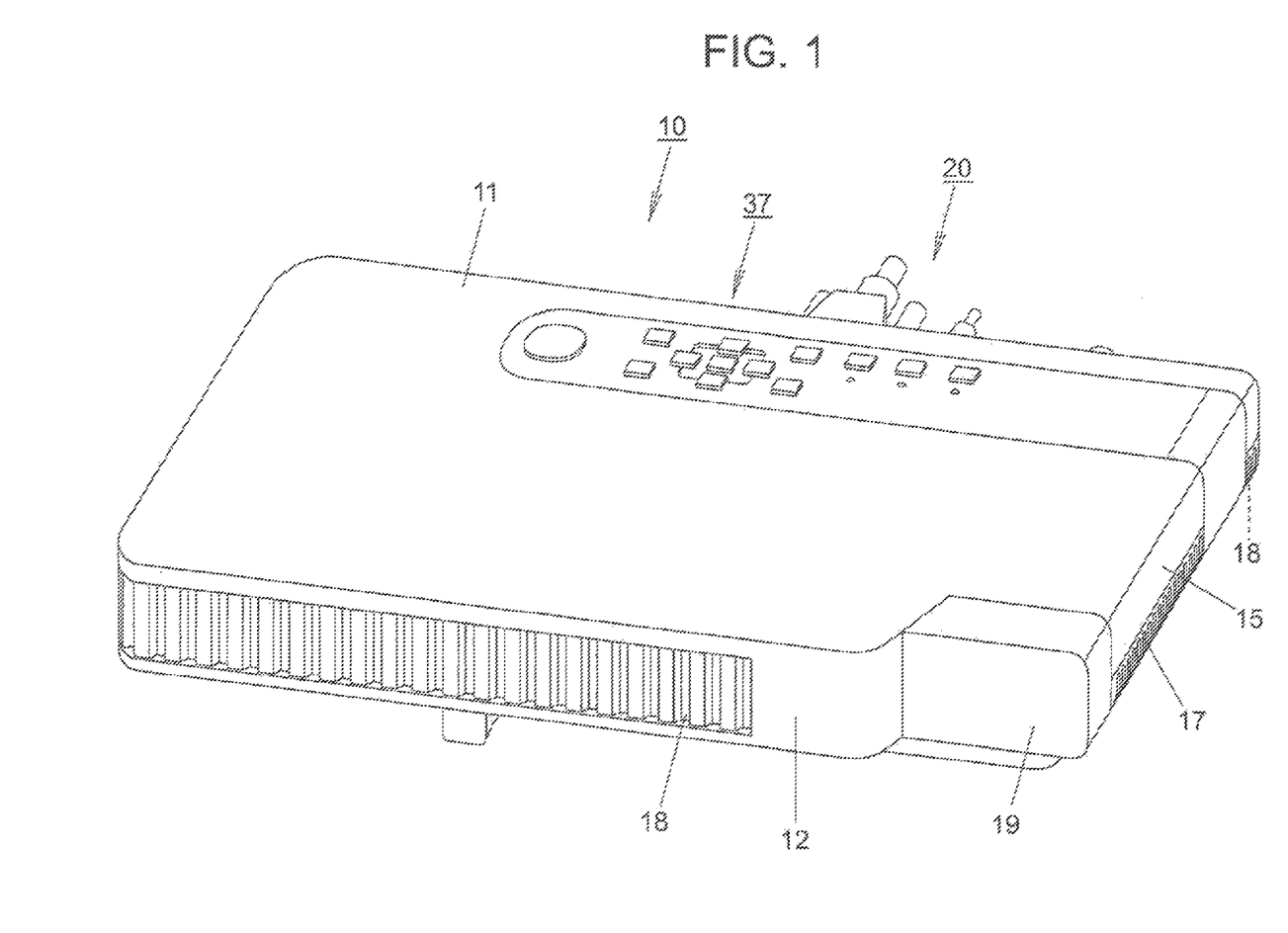
FIG. 1 is a perspective view showing an external appearance of a projector according to an embodiment of the invention.

Hereinafter, an embodiment of the invention will be described in detail by reference to the accompanying drawings. FIG. 1 is a perspective view showing an external appearance of a projector 10. In this embodiment, when a description is made on left and right with respect to the projector 10, they denote, respectively, left and right of the projector 10 with respect to a projecting direction, and when a description is made on front and rear with respect to the projector 10, they denote, respectively, front and rear of the projector 10 with respect to the direction of a screen and a traveling direction of a pencil of light.

As is shown in FIG. 1, the projector 10 has a substantially rectangular parallelepiped shape and has a lens cover 19 which covers a projection opening which is laid to a side of a front panel 12 which is referred to as a front side panel of a projector housing, as well as a plurality of outside air inlet holes 18 which are provided in the front panel 12. Further, although not shown, the projector 10 includes an Ir reception unit for receiving a control signal from a remote controller.

In addition, a keys/indicators unit 37 is provided on an upper panel 11 of the housing. Disposed on this keys/indicators unit 37 are keys and indicators which include a power supply switch key, a power indicator which informs whether a power supply for the projector 10 is on or off, a projection switch key which switches on or off the projection by the projector 10, and an overheat indicator which informs of an overheat condition when a light source unit, a display element, a control circuit or the like overheats.

Further, provided on a back side or a back panel of the housing are an input/output connector unit where a USB terminal, an image signal input D-SUB terminal into which analog RGB image signals are inputted, an S terminal, an RCA terminal, an audio output terminal and the like and various types of terminals 20 including a power supply adaptor plug and the like. In addition, a plurality of outside air inlet holes are formed in the back panel.

Additionally, a plurality of inside air outlet holes 17 are formed in each of a right side panel which is a side panel of the housing which is not shown and a left side panel 15 which is a side panel shown in FIG. 1. In addition, outside air inlet holes 18 are also formed in a corner portion defined between the left side panel 15 and the back panel.

Next, a projector control unit of the projector 10 will be described by use of a functional block diagram in FIG. 2. The projector control unit includes a control module 38, an input/output interface 22, an image transforming module 23, a display encoder 24, a display drive module 26 and the like.

The control module 38 governs the control of respective operations of circuitries within the projector 10 and includes a CPU, a ROM which stores in a fixed fashion operation programs of various types of settings and a RAM which is used as a working memory.

The projector control unit controls so that image signals of various standards that are inputted from an input/output connector unit 21 are sent via the input/output interface 22 and a system bus (SB) to the image transforming module 23 where the image signals are transformed so as to be unified into an image signal of a predetermined format which is suitable for display. Thereafter, the image signals so transformed are outputted to the display encoder 24.

Then, the display encoder 24 deploys the image signals inputted thereinto on a video RAM 25 for storage therein and then generates a video signal from the contents stored in the video RAM 25, outputting the video signal so generated to the display drive module 26.

The display drive module 26 functions a display element control module and drives a display element 51 which is a spatial optical modulator (SOM) at an appropriate frame rate in response to the image signal outputted from the display encoder 24.

In this projector 10, a pencil of light which is emitted from a light source unit 60 is shone on to the display element 50 via a light source-side optical system, which will be described later, to thereby form an optical image based on reflected light reflected at the display element 51, and the image so formed is then projected on to a screen, not shown, for display via a projection-side optical system.

It should be noted that a movable lens group 235 of the projection-side optical system is driven by a lens motor 45 for zooming or focusing.

In addition, an image compression/expansion module 31 performs a recording operation in which a luminance signal and a color difference signal of an image signal are data compressed through ADCT and Huffman coding and the compressed data is sequentially written in a memory card 32 which is configured as a detachable recording medium.

Further, when in a reproducing mode, the image compression/expansion module 31 reads out image data recorded in the memory card 32 and expands individual image data which make up a series of dynamic images frame by frame. Then, the image data is outputted to the display encoder 24 via the image transforming module 23 so as to enable the display of dynamic images based on the image data stored in the memory card 32.

Operation signals generated at the keys/indicators unit 37 which includes the main keys, indicators and the like provided on the upper panel 11 of the housing are sent out directly to the control module 38. Key operation signals from the remote controller are received by an Ir reception unit 35, and a code signal demodulated at an Ir processing module 36 is outputted to the control module 38.

In addition, an audio processing unit 47 is connected to the control module 38 via the system bus (SB). This audio processing unit 47 includes a sound source circuit such as a PCM sound source. When in a projection mode and a reproducing mode, the audio processing unit 47 converts audio data into analog signals and drives a loud speaker 48 to output loudly sound or voice based on the audio data.

Additionally, the control module 38 controls a light source control circuit 41 as a light source control unit. This light source control circuit 41 individually controls the emission of light rays in red, green and blue wavelength bands therefrom so that light in a predetermined wavelength band required when in generation of an image is emitted from the light source unit 60.

Further, the control module 38 causes a cooling fan drive control circuit 43 to execute a temperature detection using a plurality of temperature sensors provided in the light source unit 60 so as to control the rotation speed of a cooling fan based on the results of the temperature detection executed. Additionally, the control module 38 also controls the cooling fan drive control circuit 43 so that the cooling fan continues to rotate even after the power supply to a projector main body is switched off using a timer and the like, or the power supply to the projector main body is switched off depending upon the results of the temperature detection executed.

Figure 3:
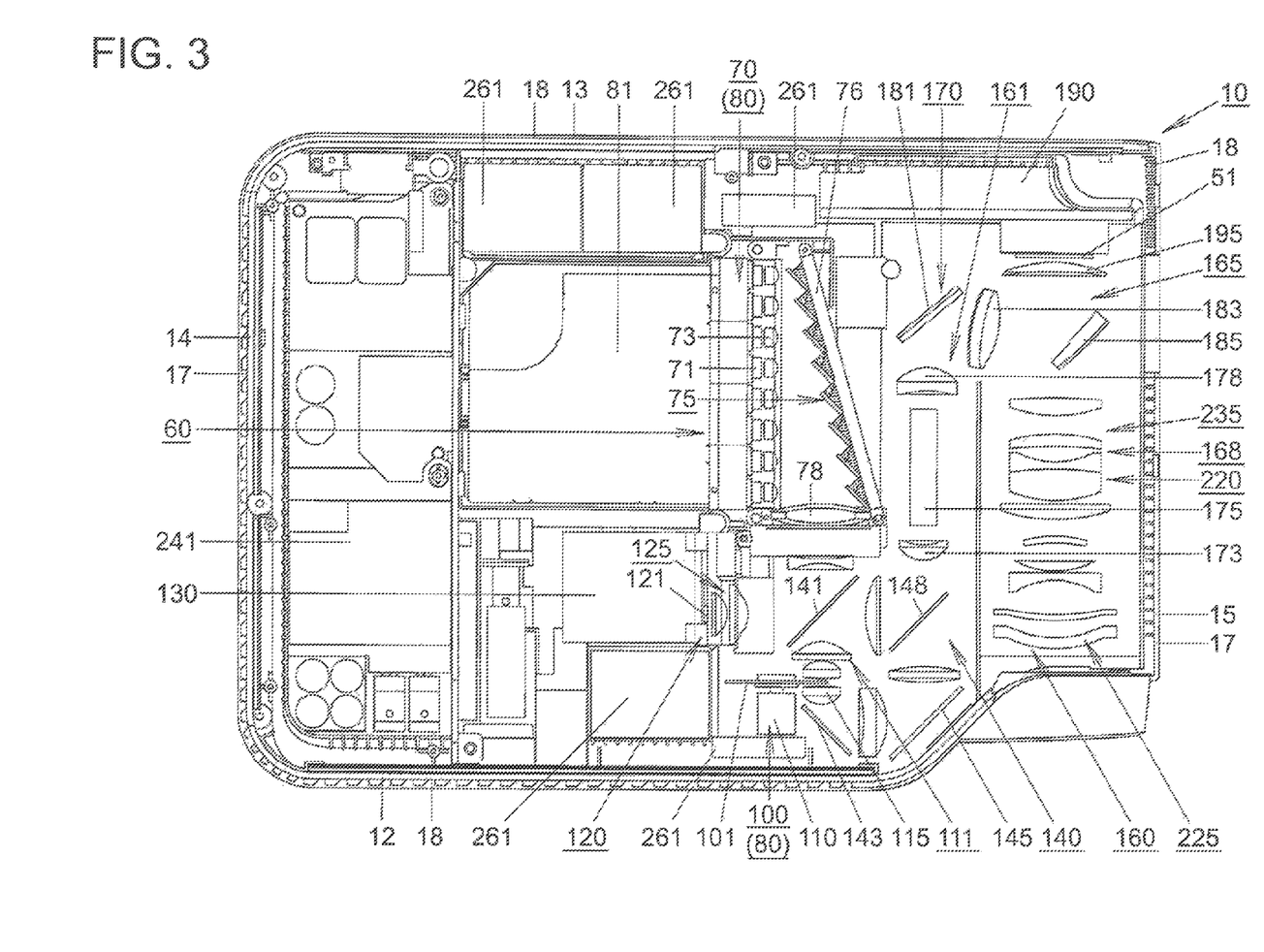
FIG. 3 is a schematic plan view showing exemplarily an internal construction of the projector according to the embodiment of the invention.
Figure 4:
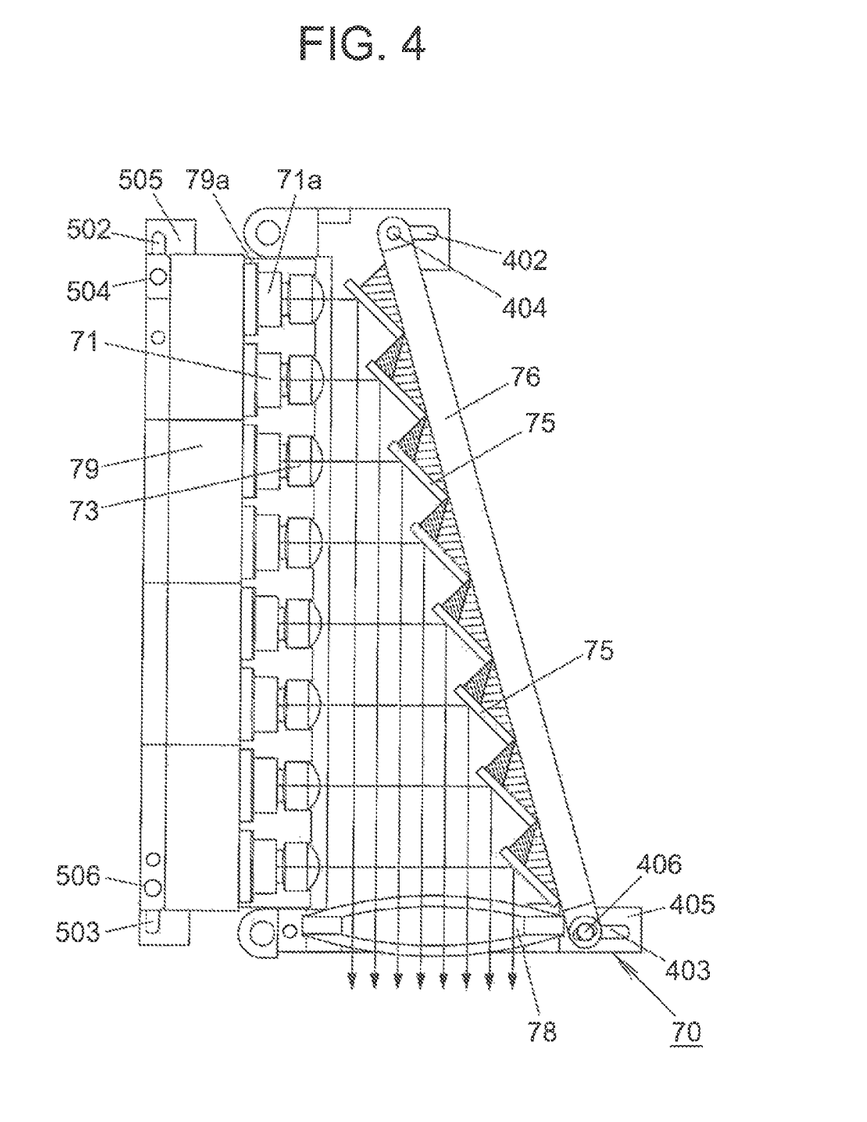
FIG. 4 is an explanatory diagram showing the construction of a light source device according to the embodiment of the invention.

Next, an internal construction of the projector 10 will be described. FIG. 3 is a schematic plan view showing exemplarily the internal construction of the projector 10, and FIG. 4 is an explanatory diagram of a light source device within the projector 10.

As shown in FIG. 3, the projector 10 includes a control circuit board 241 which is situated near the right side panel 14. This control circuit board 241 includes a power supply circuit block, a light source control block and the like. Additionally, the projector 10 includes the light source unit 60 which is situated to a side of the control circuit board 241, that is, includes the light source unit 60 in a substantially central portion of the projector housing. Further, the projector 10 includes an optical system unit 160 which is situated between the light source unit 60 and the left side panel 15.

The light source unit 60 includes a blue light source device 70, a luminous light emitting device 100, a red light source device 120, and a light guiding optical system 140. The blue light source device 70 is disposed in a transversely and substantially central portion of the projector housing and near the back panel 13. The luminous light emitting device 100 is disposed on an optical axis of a pencil of light which is emitted from the blue light source device 70 and near the front panel 12. The red light source device 120 is disposed between the blue light source device 70 and the luminous light emitting device 100. The light guiding optical system 140 turns optical axes of light rays emitted from the luminous light emitting device 100 and the red light source device 120 into the same optical axis so that the red, green and blue light rays are collected to an entrance of a light tunnel 175 which constitutes a predetermined plane.

The blue light source device 70 includes a light source group made up of a plurality of blue light sources 71 disposed so that optical axes thereof become parallel to the back panel 13, reflection mirrors 75 which turn the optical axes of light rays emitted from the individual blue light sources 71 by 90 degrees towards the direction of the front panel 12, a collective lens 78 which collects the light rays emitted from the individual blue light sources 71 and reflected by the reflection mirrors 75 and a heat sink 81 which is disposed between the blue light sources 71 and the right side panel 14.

In the light source group, the blue light sources 71, which are a plurality of blue laser emitting devices, are arranged into a matrix shape. Additionally, collimator lenses 73 are disposed individually on the optical axes of the blue light sources 71, and these collimator lenses 73 transform the light rays emitted from the blue light sources 71 into parallel beams so as to enhance the directivity of each of the light rays emitted.

In addition, the reflection mirrors 75 are arranged into a stairs-like configuration and are integrated with a mirror base 76 while being adjusted in their positions, so that sectional areas of pencils of light emitted from the blue light sources 71 are reduced in one direction for emission to the collective lens 78. The reflection mirrors 75 will be described in detail later.

A cooling fan 261 is disposed between the heat sink 81 and the back panel 13, and the blue light sources 71 are cooled by the cooling fan 261 and the heat sink 81.

Further, a cooling fan 261 is also disposed between the reflection mirrors 75 and the back panel 13, and the reflection mirrors 75 and the collective lens 78 are cooled by this cooling fan 261.

The luminous light emitting device 100 includes a luminescent wheel 101, a wheel motor 110 which drives to rotate the luminescent wheel 101, a collective lens group 111, and a collective lens 115. The luminescent wheel 101 is disposed so as to be parallel to the front panel 12, that is, so as to be at right angle to optical axes of light rays emitted from the blue light source device 70. The collective lens group 111 collects a pencil of light emitted from the blue light source device 70 to the luminescent wheel 101 and collects a pencil of light emitted from the luminescent wheel 101 in the direction of the back panel 13. The collective lens 115 collects a pencil of light emitted from the luminescent wheel 101 in the direction of the front panel 12.

A green luminous light emitting area and a diffusive transmission area are provided end to end on the luminescent wheel 101. The green luminous light emitting area functions as a green light source device 80 which receives light emitted from the blue light source device 70 as excitation light and emits luminous light in the green wavelength band. The diffusive transmission area transmits light emitted from the blue light source device 70 in a diffusing fashion.

In addition, a base of the green luminous light emitting area is a metallic base which is made of copper or aluminum. A surface of a side of the base which faces the back panel 13 is mirror finished through silver deposition, and a layer of a green luminescent material is laid on this mirror finished surface.

Further, a base of the diffusive transmission area is a transparent base having light transmission properties, and minute irregularities are formed on a surface of the base through sand blasting.

Light emitted from the blue light source device 70 and shone on to the green luminescent material layer of the luminescent wheel 101 which functions as the green light source device excites the green luminescent material in the green luminescent material layer. Pencils of luminous light emitted through luminescence in every direction from the green luminescent material are directed directly towards the back panel 13 or reflected on the surface of the luminescent wheel 101 to be eventually directed towards the back panel 13 to enter the collective lens group 111.

In addition, light emitted from the blue light source device 70 and shone on to the diffusive transmission area of the luminescent wheel 101 is transmitted therethrough while being diffused by the minute irregularities and enters the collective lens 115 as diffused transmitted light.

Additionally, a cooling fan 261 is disposed between the wheel motor 101 and the front panel 12, and the luminous light emitting device 100 is cooled by this cooling fan 261.

The red light source device 120 is a single color light emitting device and includes a red light source 121 which is disposed so as to be parallel to the optical axes of the blue light devices 71 and a collective lens group 125 which collects light emitted from the red light source 121. This red light source 121 is a red light emitting diode which emits light in the red wavelength band. Additionally, this red light source device 120 is disposed so that an optical axis thereof intersects light emitted from the blue light source device 70 and light in the green wavelength band which is emitted from the luminescent wheel 101.

Further, the red light source device 120 includes a heat sink 130 which is disposed between the red light source 121 and the right side panel 14. A cooling fan 261 is disposed between the heat sink 130 and the front panel 12, and the red light source 121 is cooled by this cooling fan 261.

The light guiding optical system 140 includes collective lenses which collect pencils of light in the red, green and blue wavelength bands and reflection mirrors and dichroic mirrors which turn optical axes of the pencils of light in the red, green and blue wavelength bands into the same optical axis.

Specifically, a first dichroic mirror 141 is disposed in a position where light in the blue wavelength band emitted from the blue light source device 70 and light in the green wavelength band emitted from the luminescent wheel 101 intersect light in the red wavelength band emitted from the red light source device 120. This dichroic mirror 141 transmits light in the blue wavelength band and light in the red wavelength band, and reflects light in the green wavelength band to turn the optical axis of this green light by 90 degrees in the direction of the left side panel 15 so that the optical axis of the light in the red wavelength band and the optical axis of the light in the green wavelength band coincide with each other.

A first reflection mirror 143 is disposed on the optical axis of light in the blue wavelength band which is diffusively transmitted through the luminescent wheel 101, that is, between the collective lens 115 and the front panel 12. This reflection mirror 143 reflects the light in the blue wavelength band and turns the optical axis of this blue light by 90 degrees in the direction of the left side panel 15.

Further, a second reflection mirror 145 is disposed on the optical axis of the light in the blue wavelength band which is reflected by the first reflection mirror 143 and near the optical system unit 160. This second reflection mirror 145 turns the optical axis of this blue light by 90 degrees in the direction of the back panel 13.

A second dichroic mirror 148 is disposed in a position where the optical axis of the light in the red wavelength band which passes through the first dichroic mirror 141 and the optical axis of the light in the green wavelength band which is reflected on the first dichroic mirror 141 so as to coincide with the optical axis of the red light intersect the optical axis of the light in the blue wavelength band which is reflected on the second reflection mirror 145. This second dichroic mirror 148 transmits the light in the blue wavelength band, and reflects the light in the red wavelength band and the light in the green wavelength band to turn the optical axes of the red light and the green light by 90 degrees in the direction of the back panel 13 so that the optical axes of the light in the red wavelength band, the light in the green wavelength band and the light in the blue wavelength band coincide with each other.

Additionally, a light collective lens is disposed individually between the pair of reflection mirrors and the pair of dichroic mirrors. Further, a collective lens 173 is disposed near the light tunnel 175, and this collective lens 173 collects the light from the respective light sources to the entrance of the light tunnel.

The optical system unit 160 is formed into a U shape by three blocks including an illumination side block 161 which is situated to the left of the blue light source device 70, an image generation block 165 which is situated near a position where the back panel 13 and the left side panel 15 intersect each other and a projection side block 168 which is situated between the light guiding optical system 140 and the left side panel 15.

The illumination side block 161 includes part of a light source-side optical system 170 which guides light source light emitted from the light source unit 60 to the display element 51 which is included in the image generation block 165. Part of the light source-side optical system 170 possessed by the illumination side block 161 includes the light tunnel 175 which converts a pencil of light emitted from the light source unit 60 into a pencil of light of which the intensity is uniformly distributed, a collective lens 178 which collects light emitted from the light tunnel 175 and an optical axis turning mirror 181 which turns the optical axis of a pencil of light emitted from the light tunnel 175 in the direction of the image generation block 165.

The image generation block 165 has, as the light source-side optical system 170, a collective lens 183 which collects the light source light which is reflected by the optical axis turning mirror 181 to the display element 51 and a shining mirror 185 which shines a pencil of light which passes through the collective lens 183 on to the display element 51 at a predetermined angle. The image generation block 165 includes further a DMD, which is the display element 51.

A heat sink 190 for cooling the display element 51 is disposed between the display element 51 and the back panel 13, and the display element 51 is cooled by this heat sink 190.

Additionally, a collective lens 195, which is part of a projection-side optical system 220, is disposed near a front surface of the display element 51.

The projection side block 168 has a lens group of the projection-side optical system 220 which projects "on" light which is reflected by the display element 51 on to a screen. This projection-side optical system 220 includes a fixed lens group 225 which is incorporated in a fixed lens barrel and the movable lens group 235 which is incorporated in a movable lens barrel. These fixed lens group 225 and movable lens group 235 make up a variable focus lens having a zooming function, and the movable lens group 235 is moved by the lens motor for zooming and focusing.

By configuring the projector 10 in the way described heretofore, when the luminescent wheel 101 is rotated and light is emitted from the blue light source device 70 and the red light source device 120 at different timings, light in the red wavelength band, light in the green wavelength band and light in the blue wavelength band are allowed to enter the light tunnel 175 sequentially by way of the light guiding optical system 140. Further, the light in the red wavelength band, the light in the green wavelength band and the light in the blue wavelength band are allowed to enter the display element 51 byway of the light source-side optical system 170. Therefore, the DMD which is the display element 51 of the projector 10 time-share displays the light in the respective colors according to data, whereby a color image can be generated on the screen.

Next, the configuration of the light source device of the invention will be described in detail.

FIG. 4 is an explanatory diagram showing the configuration of the blue light source device 70. In this light source device, it is understood that a forward direction denotes a traveling direction of light which is emitted from the blue light sources 71 as shown in the FIG. 4.

As shown in FIG. 4, the blue light source device 70 includes the blue light sources 71 which make up a light source group made up of a plurality of light emitting elements, the collimator lenses 73 which convert individual light rays emitted from the blue light sources 71 into parallel beams, a holder 79 which has element accommodating portions 79a which accommodate individually the blue light sources 71 to hold the blue light sources 71 in place therein, a reflection mirror group which is made up of the plurality of reflection mirrors 75 which turn the optical axis of light rays emitted from the blue light sources 71 by 90 degrees, the mirror base 76 which holds the reflection mirror group, and the collective lens 78 which collects light rays emitted from the blue light sources 71 and reflected by the reflection mirror group.

The holder 79 has 24 element accommodating portions 79a which fixedly hold the light emitting elements, and the accommodating portions 79a are arranged in three rows and eight columns.

Figure 5:
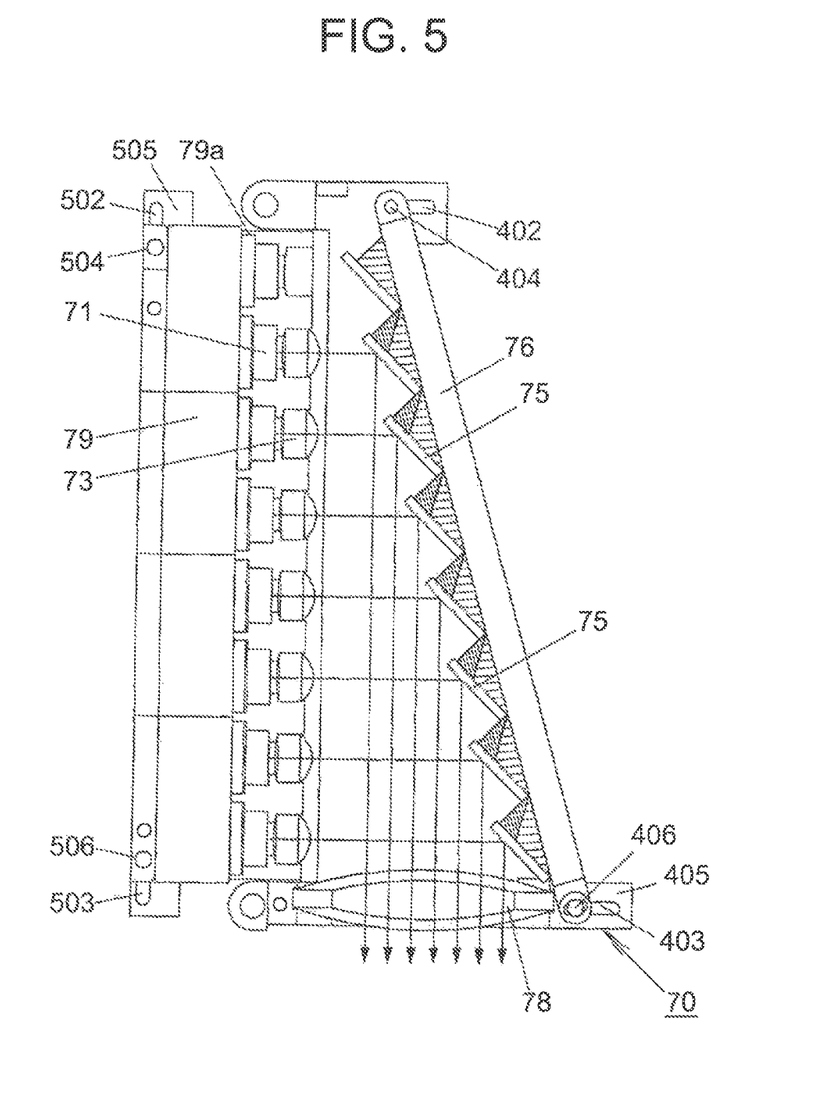
FIG. 5 is an explanatory diagram showing the construction of the light source device according to the embodiment of the invention.

The blue light source device 70 is preferably configured so that a center of a whole of optical axes of pencils of light emitted from the element accommodating portions 79a which hold individually the blue light sources 71 is translated in parallel to ensure a proper light collection balance of the collective lens 78, when the light emitting elements 7a in a left end column are not illuminated or when the light emitting elements of the light sources 71 accommodated in the element accommodating portions 79a of the left end column are removed as shown in FIG. 5 to fabricate alight source device designed to a specification of a lower luminance.

Figure 6A:
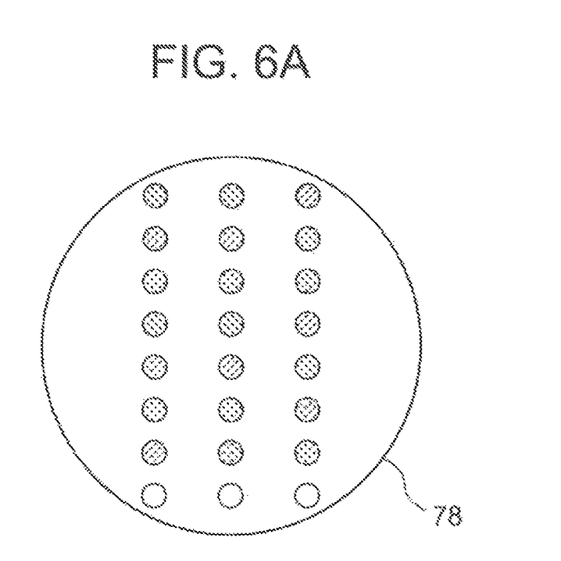
FIG. 6A is an explanatory diagram showing a light collection balance of the light source device according to the embodiment of the invention in which light sources are arranged into three rows and eight columns.
Figure 6B:
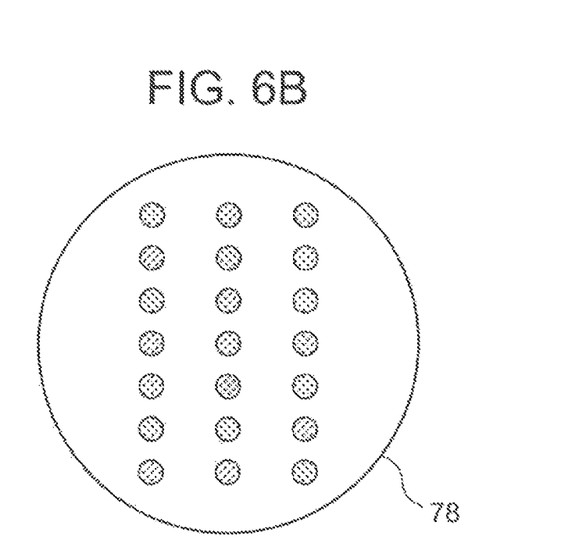
FIG. 6B is an explanatory diagram showing a light collection balance of the light source device according to the embodiment of the invention in which light sources are arranged into three rows and seven columns.

FIGS. 6A, 6B are explanatory diagrams for illustrating light collection balances of the collective lens 78 according to the embodiment of the invention as seen from the direction of the optical axis (the normal direction) of the blue light sources 71.

Specifically speaking, in the above case, when the light emitting elements of the left end column of the blue light sources 71 are removed as shown in FIG. 5, the arrangement of the light emitting elements illuminated is changed from the array of three rows and eight columns to an array of three rows and seven columns as shown in FIG. 6A. Therefore, the light distribution on the collective lens 78 which is illuminated by the light from the illuminated light emitting elements is offset (the light emitting elements indicated by broken lines are not illuminated).

In this case, an adjusting portion is provided to adjust the light distribution on the collective lens 78. For example, the mirror base plate 76 which fixes integrally the reflection mirrors 75 which reflect pencils of light emitted from the blue light sources 71 and mirror base portions 405 where the mirror base plate 76 is mounted movably are made to move at mounting portions which are situated at both ends of the mirror base plate 76, whereby the light distribution can be adjusted.

Namely, in this adjusting portion, in mounting the mirror base plate 76 on the mirror base portions 405, elongated holes 402, 403 which are elongated in a front-to-rear direction are formed in the mounting portions of the mirror base portions 405 so that the mirror base plate 76 can move in the front-to-rear direction which is the direction of optical axes of light rays entering the reflection mirrors 75 thereon, and the mirror base plate 76 is then mounted on the mirror base portions 405 at holes 404, 406 formed therein so that the mirror plate 76 can move in the front-to-rear direction.

Consequently, the adjusting portion enables the mirror base plate 76 to be translated in parallel. Thus, the center of the whole of optical axes of the pencils of light emitted from the light sources 71 and reflected by the reflection mirrors 75 to enter the collective lens 78 is translated in parallel to ensure a proper light collection balance of the collective lens 78 as shown in FIG. 6B.

Additionally, the adjusting portion may be configured so that the center of the whole of optical axes of the pencils of light emitted from the blue light sources 71 is translated in parallel by translating the holder 79 in parallel.

As this occurs, when the light distribution is offset as shown in FIG. 5, the adjusting portion can adjust the center of the optical axes of the pencils of light emitted from the light sources 71 to ensure the proper light distribution by allowing the holder 79, which accommodates therein the blue light sources 71 and the collimator lenses 73, and holder base portions 505, on which the holder 79 is mounted so as to move in a left-to-right direction which is a normal direction to the direction of the optical axes of the pencils of light emitted from the blue light sources 71, to move at mounting portions which are situated at both ends of the holder 79.

Namely, in mounting the holder 79 on the holder base portions 505, elongated holes 502, 503 which are elongated in the left-to-right direction are formed in the mounting portions of the holder base portions 505 so that the holder 79 can move in the left-to-right direction, and the holder 79 can be mounted on the holder base portions 505 at holes 505, 506 formed therein so that the holder 79 can move in the left-to-right direction.

Consequently, the adjusting portion can translate in parallel the center of the whole of optical axes of the pencils of light emitted from the blue light sources 71 also by translating in parallel the holder 79 as by translating in parallel the mirror base plate 76 so as to ensure the proper light collection balance of the collective lens 78 as shown in FIG. 6B.

Additionally, the adjusting portion may move both the reflection mirrors 75 on the mirror base plate 76 and the holder 79 so as to ensure the proper light collection balance by the collective mirror 78.

In addition, in order to mount the holder 79 on the holder base portions in a predetermined mounting position, for example, a plurality of mounting holes are provided in the direction in which the holder 79 can be adjusted in position in each of the holder base portions at intervals which are half a center-to-center distance of the element accommodating portions 79a which are disposed at equal intervals. Then, the holder 79 may be mounted on the holder base portions by selecting a mounting hole from the plurality of mounting holes at each of the holder base portions according to the location where the light emitting elements are turned off so as to translate in parallel the center of the whole of optical axes of the pencils of light emitted from the blue light sources 71, whereby the proper light distribution is ensured.

In ensuring the proper light collection balance of the collective lens 78, it is easier to move the reflection mirrors 75 which are light in weight than to move the holder 79 for adjustment of the center of the whole of optical axes of the pencils of light emitted from the blue light sources 71.

Further, the invention is not limited to the contracted optical system in which the plurality of reflection mirrors 75 are arranged in the stairs-like configuration, and hence, a single reflection mirror may be used instead.

In the adjusting portion, the moving direction of the mirror base plate 76 is not limited to the direction of the optical axes of pencils of light emitted from the blue light sources 76 to enter the reflection mirrors 75 thereon. The mirror base plate 76 may be moved in an inclined direction relative to the incident light on the reflection mirrors 75 thereon so as to optimize the light collection balance of the collective lens 78.

In the embodiment described above, while the light collection balance is described as being adjusted in the direction of columns, even when the light collection balance needs to be adjusted in the direction of rows, the need can be dealt with by providing on the holder 79 a mechanism to move the holder 79 in a normal direction to the surfaces of sheets of paper on which FIGS. 4 and 5 are drawn.

In addition, as another configuration for ensuring the proper light collection balance of the collective lens 78, there may be provided a configuration in which an illuminated/unilluminated position acquiring unit is provided which acquires information on illuminated or unilluminated positions on the holder 79 when part of the blue light sources is made to be unilluminated or when part of the blue light sources fails to be illuminated, and the adjusting portion has a mechanical configuration utilizing a rack and pinion mechanism which translates in parallel the center of the whole of optical axes of the pencils of light emitted from the blue light sources 71 by driving a motor based on the illuminated position information or the unilluminated position information acquired by the illuminated/unilluminated position acquiring unit. Alternatively, the adjusting portion may have a translating mechanism using a driving element such as a piezoelectric actuator in place of the above configuration.

More specifically, the adjusting portion calculates a center of a whole of optical axes of pencils of light emitted from illuminated ones of the light emitting elements based on the illuminated position information or the unilluminated position information acquired. Then, the mirror base plate 76 and/or the holder 79 is moved by the moving mechanism so as to ensure the calculated center of the whole of optical axes on the collective lens 78 to thereby adjust the light collection balance thereof.

In that case, specific constitutional example will be described by reference to the FIGS. 7 and 8.

Figure 7:
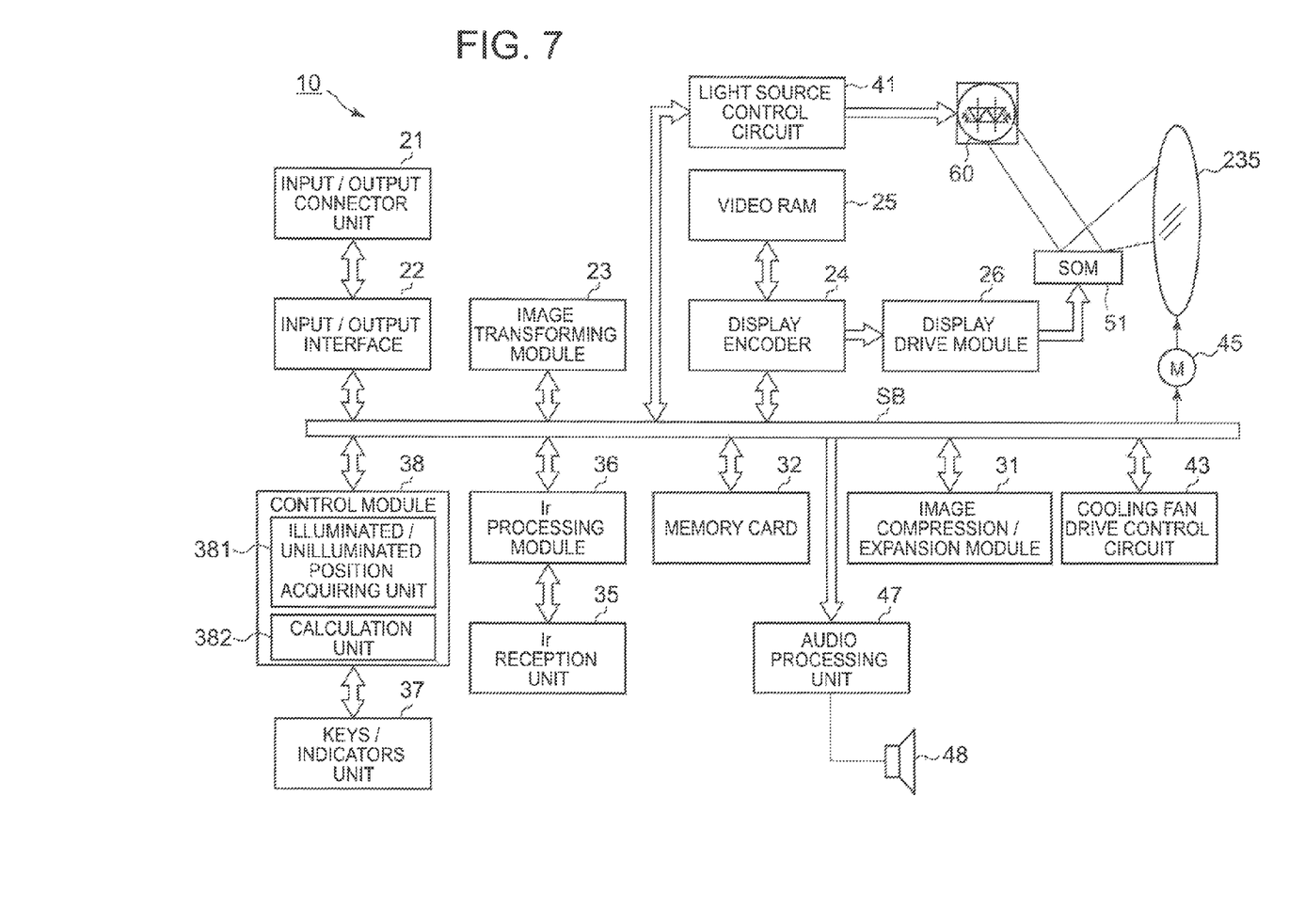
FIG. 7 is a functional block diagram of the projector including the moving mechanism according to the embodiment of the invention.
Figure 8:
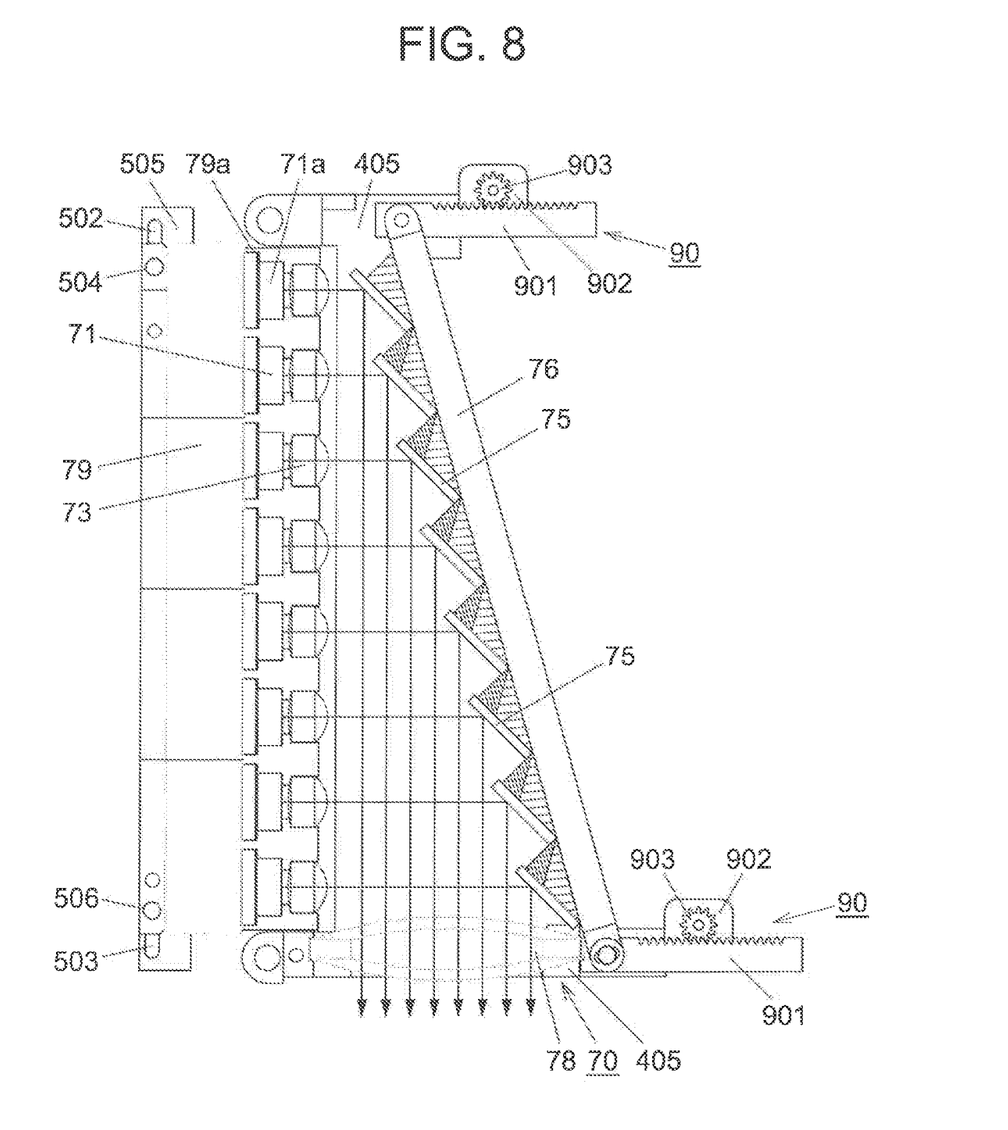
FIG. 8 is an explanatory diagram showing the construction of a light source device including the moving mechanism according to the embodiment of the invention.

FIG. 7 is a functional block diagram of the projector and FIG. 8 is a diagram showing the construction of a light source device including the moving mechanism.

Figure 2:
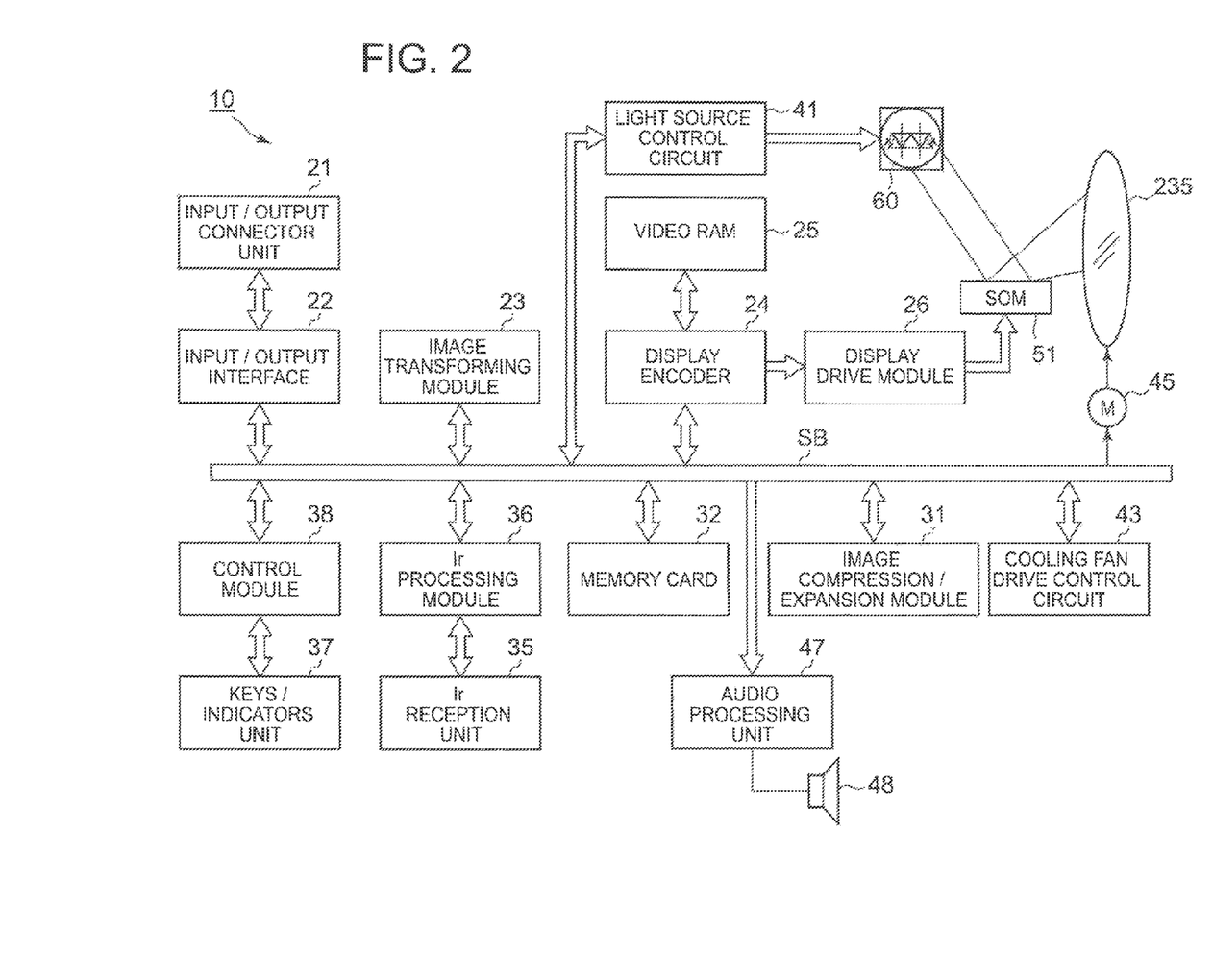
FIG. 2 is a functional block diagram of the projector according to the embodiment of the invention.

In the FIGS. 7 and 8, the same numbers or marks are affixed to the same members or elements as those showing in the FIGS. 2 and 5 respectively.

In the FIG. 7, an illuminated/unilluminated position acquiring unit 381 within the control module 38 acquires information on illuminated or unilluminated positions of the plurality of light emitting elements from the light source control circuit 41, and a calculation unit 382 within the control module 38 calculates a center of a whole of optical axes of pencils of light emitted from the blue light sources 71 part of which is unilluminated based on the illuminated position information or the unilluminated position information acquired by the illuminated/unilluminated position acquiring unit 381.

In addition, the control module 38 outputs a command to a moving mechanism 90 as shown in the FIG. 8 to translate the mirror base plate 76 based on the calculated center of a whole of optical axes.

In this specific constitutional example, the moving mechanism is configured so as to translate the mirror base plate 76 in a front-rear direction by moving racks which are respectively fixed both ends of the mirror base plate 76 by means of respective pinions which are pivotably supported to drive shafts of motors 902.

By adopting this configuration, even when some of the light emitting elements of the light source device become unilluminated not in a regular fashion like column by column or row by row but in an irregular fashion, the light collection balance can be adjusted as required.

Thus, by adopting this configuration, in the light source device as a finished part which is incorporated into the projector 10, even when some of the blue light sources 71 become unilluminated due to their service lives or failure, the light source device can automatically ensure the proper light collection balance by detecting the unilluminated blue light sources 71 and translating in parallel the center of a whole of optical axes of pencils of light emitted from the blue light sources 71 which are kept illuminated properly by using the moving mechanism.

Further, even in the case of a configuration being adopted in which the light source device has no reflection mirrors whereby light is shone from the blue light sources 71 directly on to the collective lens 78, as has been described above, the light source device still includes the holder 79 which has the elements accommodating portions 79a which individually hold the blue light sources 71 therein. Thus, the light source device can ensure the proper light collection balance of the collective lens 78 by translating in parallel the holder 79.

Thus, as has been described heretofore, according to the embodiment, it is possible to provide the light source device which can rearrange the light collection balance and the projector 10 including the light source device.

Additionally, according to the embodiment of the invention, it is possible to fabricate light source devices which differ in brightness by using common parts by configuring them so that the center of a whole of optical axes of pencils of light emitted from blue light sources 71 is translated in parallel by translating in parallel reflection mirrors 75 and/or a holder 79.

Specifically speaking, it is possible to change the number of light emitting elements or blue light sources without deterioration in illuminance distribution or color irregularities of projecting light as well as without replacing the basic optical parts such as the holder 79, the reflection mirrors 75 and the collective lens 78 continuing to be used.

By adopting this configuration, it is possible to produce different types of light sources using the same or common parts, providing a superior advantage that an efficient production becomes possible for a line-up of different models.

According to the embodiments of the invention, it becomes easy to adjust the light collection balance by adopting the configuration in which the center of the whole of optical axes of the pencils of light emitted from the blue light sources 71 is translated in parallel by translating in parallel the optical axes of the reflection mirrors 75 and/or the holder 79 in the direction of the optical axes thereof or in the direction normal to the direction of the optical axes.

Further, according to the embodiments of the invention, the plurality of mounting holes are provided which enables the mounting positions of the reflection mirrors 75 and/or the holder 79 to be moved, and by adopting the configuration in which the reflection mirrors 75 and/or the holder 79 is mounted by selecting the mounting hole therefor from the plurality of mounting holes to thereby translate in parallel to the center of the whole of optical axes of the pencils of light emitted from the blue light sources 71, it is possible to fabricate easily light source devices which differ in brightness while giving them a proper light collection balance without requiring fine adjustments.

In addition, according to the embodiments of the invention, the light source device has the moving mechanism for translating in parallel the center of the whole of optical axes of the pencils of light emitted from the blue light sources 71 in response to the illuminated position information or the unilluminated position information, and therefore, it is possible to automatically adjust the light collection balance to the proper light collection balance.

While the embodiments of the invention have been described heretofore, the embodiments are presented to illustrate the examples to carry out the invention and hence are not intended to limit the scope of the invention.

These novel embodiments can be carried out in other various forms, and various omissions, replacements or modifications can be made thereto without departing from the spirit and scope of the invention. These embodiments and their modifications are contained in the spirit and scope of the invention and are also contained in the scope of inventions claimed herein and equivalents thereof.

What is claimed is:

1. A light source device comprising:
   a holder having element accommodating portions each of which accommodates one of a plurality of light emitting elements;
   a plurality of reflection mirrors which reflect pencils of light emitted from the plurality of light emitting elements;
   a mirror base on which the reflection mirrors are fixed;
   mirror base portions on which ends of the mirror base are mounted, respectively;
   an adjusting portion which comprises elongated holes respectively provided in the mirror base portions, the elongated holes being elongated in a direction along which light is emitted from the plurality of light emitting elements, wherein the adjusting portion is configured such that the mirror base is movable along the elongated holes to move the reflection mirrors so as to translate in parallel centers of optical axes of all pencils of light which are emitted from the plurality of light emitting elements and reflected by the reflection mirrors.

2. The light source device according to claim 1, wherein the adjusting portion further comprises a plurality of mounting holes by which a mounting position of the holder can be moved, and the centers of the optical axes of all the pencils of light emitted from the light emitting elements are translated in parallel by mounting the holder in a selected one of the plurality of mounting positions.

3. The light source device according to claim 1, further comprising:
   a collective lens which collects the pencils of light which are adjusted by the adjusting portion.

4. A projector comprising:
   the light source device according to claim 1;
   a display element;

a light source-side optical system for guiding light from the light source device to the display element;

a projection-side optical system for projecting an image emitted from the display element onto a screen; and a projector control unit for controlling the light source device and the display element.

5. A light source device comprising:

a holder having element accommodating portions each of which accommodates one of a plurality of light emitting elements;

holder base portions on which ends of the holder are mounted, respectively; and an adjusting portion comprises elongated holes respectively provided in the holder base portions, the elongated holes being elongated in a direction normal to optical axes along which light is emitted from the plurality of light emitting elements, wherein the adjusting portion is configured such that the holder is movable along the elongated holes to translate in parallel centers of the optical axes of all pencils of light which are emitted from the plurality of light emitting elements.

6. The light source device according to claim 5, wherein the adjusting portion further comprises a plurality of mounting holes by which a mounting position of the holder can be moved, and the centers of the optical axes of all the pencils of light emitted from the light emitting elements are translated in parallel by mounting the holder in a selected one of the plurality of mounting positions.

7. The light source device according to claim 5, further comprising:

a collective lens which collects the pencils of light which are adjusted by the adjusting portion.

8. A projector comprising:

the light source device according to claim 5;

a display element;

a light source-side optical system for guiding light from the light source device to the display element;

a projection-side optical system for projecting an image emitted from the display element onto a screen; and a projector control unit for controlling the light source device and the display element.

* * * * *